United States Patent
Ueyama et al.

(10) Patent No.: US 9,574,038 B2
(45) Date of Patent: Feb. 21, 2017

(54) CONTACT LENSES MADE WITH HEMA-COMPATIBLE POLYSILOXANE MACROMERS

(71) Applicant: CooperVision International Holding Company, LP, St. Michael (BB)

(72) Inventors: Hiroyuki Ueyama, Miyazaki (JP); Charlie Chen, San Ramon, CA (US); Yuan Xu, Fremont, CA (US); Yuwen Liu, Dublin, CA (US); Ying Zheng, Pleasanton, CA (US); Paul Richardson, San Ramon, CA (US); Hong Xue, Pleasanton, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 15/115,271

(22) PCT Filed: Feb. 25, 2015

(86) PCT No.: PCT/GB2015/050537
§ 371 (c)(1),
(2) Date: Jul. 29, 2016

(87) PCT Pub. No.: WO2015/128636
PCT Pub. Date: Sep. 3, 2015

(65) Prior Publication Data
US 2017/0008990 A1    Jan. 12, 2017

Related U.S. Application Data

(60) Provisional application No. 61/946,138, filed on Feb. 28, 2014.

(51) Int. Cl.
| | | |
|---|---|---|
| *C08F 220/20* | (2006.01) | |
| *C08G 77/20* | (2006.01) | |
| *C08G 77/46* | (2006.01) | |
| *B29C 35/02* | (2006.01) | |
| C08F 220/28 | (2006.01) | |
| B29K 83/00 | (2006.01) | |
| B29L 11/00 | (2006.01) | |

(52) U.S. Cl.
CPC ............. *C08F 220/20* (2013.01); *B29C 35/02* (2013.01); *C08G 77/20* (2013.01); *C08G 77/46* (2013.01); B29K 2083/00 (2013.01); B29L 2011/0041 (2013.01); C08F 2220/281 (2013.01)

(58) Field of Classification Search
None
See application file for complete search history.

(56) References Cited

U.S. PATENT DOCUMENTS

| | | | |
|---|---|---|---|
| 2003/0162862 A1* | 8/2003 | McCabe | A61L 27/18 523/106 |
| 2006/0106458 A1* | 5/2006 | Jason | A61L 27/18 623/6.11 |
| 2007/0242219 A1* | 10/2007 | Zanini | B29C 37/0003 351/159.33 |
| 2009/0234089 A1 | 9/2009 | Ueyama et al. | |
| 2009/0295004 A1* | 12/2009 | Pinsly | G02B 1/043 264/2.6 |
| 2011/0085128 A1* | 4/2011 | Liu | B29D 11/00038 351/159.34 |
| 2012/0115980 A1* | 5/2012 | Vanderlaan | G02B 1/043 523/107 |
| 2012/0245248 A1* | 9/2012 | Alli | C08F 290/068 523/107 |
| 2014/0009735 A1 | 1/2014 | Zheng et al. | |
| 2014/0066540 A1* | 3/2014 | Ueyama | C08G 77/46 523/107 |
| 2014/0268028 A1* | 9/2014 | Vanderlaan | G02B 1/043 351/159.33 |
| 2015/0011667 A1* | 1/2015 | Saxena | C08G 77/20 522/13 |

OTHER PUBLICATIONS

International Search Report and Written Opinion issued in corresponding International Patent Application No. PCT/GB2015/050537 dated May 7, 2015 (11 pages).
International Preliminary Report on Patentability issued in corresponding International Patent Application No. PCT/GB2015/050537 dated Feb. 10, 2016 (with Response to WO filed Dec. 21, 2015 and Article 34 claims) (16 pages).

* cited by examiner

*Primary Examiner* — Robert S Loewe
(74) *Attorney, Agent, or Firm* — Kilyk & Bowersox, P.L.L.C.

(57) ABSTRACT

HEMA-compatible siloxane monomers are described that can be used to manufacture contact lenses that combine the attributes of HEMA-based contact lenses with the high oxygen permeability of silicone hydrogel lenses. Optically clear silicone hydrogel contact lens can be manufactured that comprise a polymeric lens body that is the reaction product of a polymerizable composition comprising: a) at least 25 wt. % of at least one hydroxyalkyl methacrylate; and b) at least 20 wt. % of at least one HEMA-compatible polysiloxane.

20 Claims, No Drawings

CONTACT LENSES MADE WITH HEMA-COMPATIBLE POLYSILOXANE MACROMERS

This application is a National Stage Application of PCT/GB2015/050537, filed Feb. 25, 2015, which claims the benefit under 35 U.S.C. §119(e) of prior U.S. Provisional Patent Application No. 61/946,138, filed Feb. 28, 2014, which are incorporated in their entireties by reference herein.

BACKGROUND

The field of the disclosure is contact lenses formed from copolymerization of a hydroxyalkyl methacrylate with a HEMA-compatible bifunctional polysiloxane.

2-hydroxyethyl methacrylate (HEMA) is a biocompatible, polymerizable monomer that has been used for over the past forty years to make soft hydrogel contact lenses. HEMA-based hydrogel contact lenses are much more comfortable to wear than their rigid predecessors. However, a drawback of the HEMA-based hydrogel lenses is that they have low oxygen permeability. It was recognized that materials that provide higher oxygen permeability would be healthier for the cornea. In the late 1990s silicone hydrogel contact lenses, which have significantly higher oxygen permeability than HEMA-based hydrogel lenses, were introduced to the market. However, the siloxane monomers used to make silicone hydrogels are typically much more expensive than HEMA. In addition, the methods used to make silicone hydrogel contact lenses are substantially more complex and labor-intensive than for HEMA-based hydrogel contact lenses. It would be desirable to combine the benefits of HEMA with the oxygen permeability attributes of silicone hydrogels, however HEMA is very hydrophilic and is generally not miscible with silicone monomers.

Background publications include U.S. Pat. No. 8,053,544, U.S. Pat. No. 8,129,442, U.S. Pat. No. 4,259,467, U.S. Pat. No. 4,260,725, U.S. Pat. Publ. No. 2011/0181833, U.S. Pat. Publ. No. 20060063852, and U.S. Pat. Publ. No. 2011/0140292.

SUMMARY

We have discovered HEMA-compatible siloxane monomers that can be used to manufacture contact lenses that combine the attributes of HEMA-based contact lenses with the high oxygen permeability of silicone hydrogel lenses. An optically clear silicone hydrogel contact lens in accordance with the present disclosure comprises a hydrated polymeric lens body that is the reaction product of a polymerizable composition comprising: a) at least 25 wt. % of at least one hydroxyalkyl methacrylate; and b) at least 20 wt. % of at least one HEMA-compatible polysiloxane represented by Formula (I):

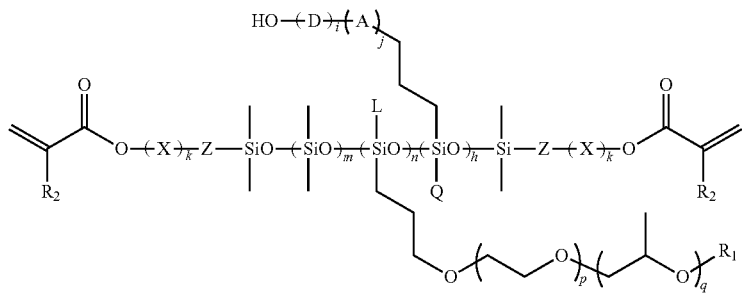

wherein $R_1$ and $R_2$ are independently selected from either hydrogen or a methyl group, X is $CH_2CH_2O$ or $CH_2CH(OH)CH_2O$, k is an integer of 0 or 1, Z is a $C_2$-$C_{10}$ alkylene, m is an integer of 0 to 160, n is an integer of 1 to 75, p is an integer of 0 to 40, q is an integer of 0 to 20, h is an integer of 0 to 75, j is an integer of 0 or 1, A is O or $CH_2$, i is an integer of 0 or 1, D is a $C_2$-$C_6$ alkylene optionally substituted with one or more groups selected from hydroxyl, methoxy, methyl, and ethyl, L is either methyl or a side chain that is the same as an opposite side chain on the same silicon atom as L, Q is either methyl or a side chain that is the same as an opposite side chain on the same silicon atom as Q, where the sum of m, n, and h is at least 5. The HEMA-compatible polysiloxane has an HLB value of at least 5, or has a hydroxyl group content of at least 1 wt. % based on the average molecular weight of the polysiloxane, or has both an HLB value of at least 5 and has a hydroxyl group content of at least 1 wt. %.

In various examples, the HEMA-compatible polysiloxane of Formula I which is used to make the optically clear silicone hydrogel contact lenses disclosed herein has any combination of one or more of the following features: an HLB value of at least 7; a hydroxyl group content of at least 4 wt. %; m is an integer of less than 60; a hydroxyl group content of at least 1 wt. % when $R_1$ is a methyl group; X is $CH_2CH(OH)CH_2O$; and/or n is an integer of at least one and h is an integer of at least one.

In various examples, the polymerizable composition used to make the optically clear silicone hydrogel contact lenses disclosed herein has any combination of one or more of the following features: the composition comprises about 0.1 wt. % to about 5 wt. % methacrylic acid or acrylic acid; the composition comprises at least 35 wt. % of the hydroxyalkyl methacrylate; the composition comprises 2-hydroxyethyl methacrylate (HEMA); and/or the composition comprises 2-hydroxybutyl methacrylate (HOB).

In various examples, the optically clear silicone hydrogel contact lenses disclosed herein have an equilibrium water content (EWC) of about 40 wt. % to about 55 wt. % and/or have a Dk of at least 35.

Also disclosed herein is a method of manufacturing the optically clear contact lenses. The method comprises: a) polymerizing the polymerizable composition to form the polymeric lens body; and b) hydrating the polymeric lens body. In some examples, the polymerizable composition is cured in a mold to form the polymeric lens body, and the polymeric lens body is dry-delensed from the mold prior to hydrating the polymeric lens body. In one example, the polymeric lens body may be dry when contacted with a packaging solution, i.e. it hydrates upon packaging. In another example, the polymeric lens body may be washed prior to being packaged with a packaging solution.

Also disclosed herein is a polysiloxane intermediate useful in making HEMA-compatible polysiloxanes. The polysiloxane intermediate has structure (2):

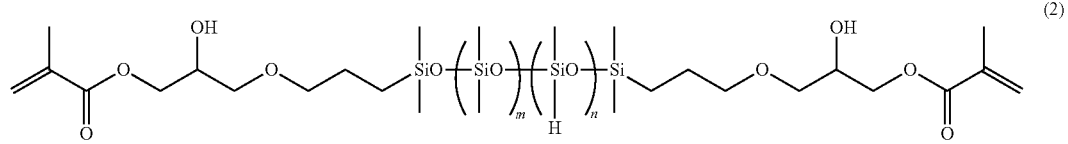

wherein m is 0 or an integer of at least 1, and n is an integer of at least 1. The compound of structure 2 may be used in a hydrosilylation reaction to make a polysiloxane.

DETAILED DESCRIPTION

As a result of extensive research, we have developed HEMA-compatible polysiloxanes that can be used to manufacture optically clear silicone hydrogel contact lenses having a high HEMA content. Accordingly, contact lenses can be manufactured using the polysiloxanes disclosed herein together with HEMA, and/or other hydroxyalkyl (meth) acrylate, thereby combining the benefits of HEMA with the oxygen permeability attributes of silicone hydrogels.

The optically clear silicone hydrogel contact lenses described herein comprise a hydrated polymeric lens body that is the reaction product of a polymerizable composition comprising at least 25 wt. % of at least one hydroxyalkyl methacrylate and at least 20 wt. % of at least one HEMA-compatible polysiloxane having a structure represented by Formula (I):

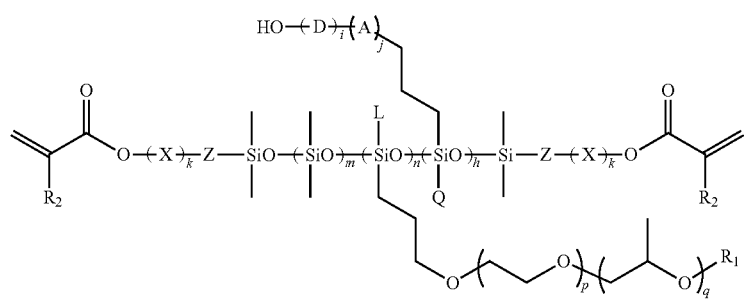

wherein $R_1$ and $R_2$ are independently selected from either hydrogen or a methyl group, X is $CH_2CH_2O$ or $CH_2CH(OH)CH_2O$, k is an integer of 0 or 1, Z is a $C_2$-$C_{10}$ alkylene, m is an integer of 0 to 160, n is an integer of 1 to 75, p is an integer of 0 to 40, q is an integer of 0 to 20, h is an integer of 0 to 75, j is an integer of 0 or 1, A is O or $CH_2$, i is an integer of 0 or 1, D is a $C_2$-$C_6$ alkylene optionally substituted with one or more groups selected from hydroxyl, methoxy, methyl, and ethyl, L is either methyl or a side chain that is the same as an opposite side chain on the same silicon atom as L, Q is either methyl or a side chain that is the same as an opposite side chain on the same silicon atom as Q, where the sum of m, n, and h is at least 5. In various examples, wherein when Z is a $C_3$ alkylene, a) X is $CH_2CH(OH)CH_2O$ and/or b) h is at least 1 and/or c) L is said side chain that is the same as an opposite side chain on the same silicon atom as L, wherein for (b) alone, when i and j are 0, then $R_1$ is methyl and/or the at least one of p and q is at least 1, and when j is 1 and A is O, then i is 1 and $R_1$ is methyl and/or p and q are both 0 or at least 1 or at least one of p and q is at least 2 and/or D is $C_3$-$C_6$ alkylene optionally substituted with one or more groups selected from hydroxyl, methoxy, methyl and ethyl. The order of m, n, and h units may be random or in blocks.

By HEMA-compatible, it is meant that the polysiloxane forms an optically clear lens made from the following test formulation and procedure. The test formulation consists essentially of a mixture of 20 parts of the polysiloxane of Formula I, 80 parts HEMA, 0.5 parts ethylene glycol dimethacrylate (EGDMA), 0.5 parts of the polymerization initiator 2,2'-azobis(2,4-dimethylpentanenitrile) (V52), optionally 0.1 to 2 parts methacrylic acid (MA), and optionally 0.1 to 30 parts water, where parts are by weight based on the total weight of the test formulation, which is a polymerizable composition. The test formulation is cured in a polypropylene contact lens mold at 80° C. for one hour. After cure, the mold is opened and the resulting polymeric lens body is either mechanically removed from the mold (i.e. dry-delensed) or is wet-delensed by immersing the mold in water until the polymeric lens body hydrates and floats off of the mold. After delensing, the polymeric lens body is then placed into fresh room temperature water for 20 minutes, then placed in a contact lens blister containing 1.8 ml phosphate buffered saline (PBS), sealed, and sterilized by autoclave. If the resulting lens is optically clear after autoclave, the polysiloxane is demonstrated to be miscible in HEMA to at least 20 wt. % and is thus considered to be HEMA-compatible. A lens is considered optically clear if it exhibits at least 90% light transmittance between 381 nm to 780 nm (measured in accordance with ISO 18369). If a polysiloxane of Formula I results in a clear lens using the above method except that the formulation has 30 parts of the polysiloxane and 70 parts HEMA, the polysiloxane is said to be miscible in HEMA to at least 30 wt. %. In various examples, a polysiloxane described herein is at least 25, 30, 35, 40, 45, or 50 wt. % miscible in HEMA. Throughout this disclosure a reference to "examples", "an example" or "a specific example" or similar phrase, is intended to introduce a feature or features of the contact lens, HEMA-compatible polysiloxane, polymerizable composition, or method of manufacture (depending on context) that can be combined with any combination of previously-described or subsequently-described examples (i.e. features), unless a particular combination of features is mutually exclusive, or if context indicates otherwise.

Some HEMA-compatible polysiloxanes of Formula I are miscible in the above test formulation (i.e. the mixture is clear), but result in a cloudy lens after curing and hydration. For some such polysiloxanes, we discovered that by adding water to the polymerizable composition, the resulting lens will be optically clear. In such examples, the HEMA-compatible polysiloxane is said to require water addition for HEMA compatibility, though it will be appreciated that other diluents besides water may also result in an optically clear lens. Thus, in various examples, the polymerizable composition additionally comprises from about 1, 5 or 10 wt. % up to about 30, 50, or 65 wt. % of a diluent, wherein the wt. % of the diluent is based on the total weight of the polymerizable composition. As used herein, the term diluent refers to a non-polymerizable component of the polymerizable composition that is added to compatibilize (i.e. make miscible) the polysiloxane with the HEMA (or other hydroxyalkyl methacrylate). In some examples, the diluent consists essentially of water, a low molecular weight polyethylene glycol (PEG), or a combination thereof. As used herein, a low molecular weight PEG has an average molecular weight of less than about 1500, and in some examples, has an average molecular weight of less than about 1200, 1000, or 800. In some examples, the HEMA-compatible polysiloxane may be prepared by a hydrosilyation reaction in which a side chain derived from a low molecular weight reactive PEG, such as hydroxyl polyethylene glycol allyl ether, is attached to a polysiloxane. In such examples, the hydrosilyation reaction product may comprise at least 70, 75 or 80 wt. % of the HEMA-compatible polysiloxane, with the remaining components being PEG and the reactive PEG (e.g. OH-PEG allyl ether). In such examples, the PEG and the OH-PEG allyl ether can be removed from the HEMA-compatible polysiloxane by further purification to provide a HEMA-compatible polysiloxane having a purity of at least 85, 90, or 95 wt. %. Alternatively, the PEG and reactive PEG can remain to function as a low molecular weight PEG diluent in the polymerizable composition. Thus, the term "low molecular weight PEG diluent" encompasses reactive PEGs (e.g. OH-PEG allyl ether) having an average molecular weight of ≤1500 that are used in preparing the polysiloxane. In specific examples, the diluent is substantially free of non-polymerizable polysiloxane-containing components, such as polysiloxane surfactants, silicone oils, or other diluents known for use in silicone hydrogel contact lens formulations. An advantage of the water and low molecular weight PEG diluents described herein is that the contact lens can be made without the use of volatile solvents.

The HEMA-compatible polysiloxane has a hydrophilic-lipophilic balance (HLB) value of at least 5, or has a hydroxyl group content of at least 1 wt. % based on the average molecular weight of the polysiloxane, or has both an HLB value of at least 5 and has a hydroxyl group content of at least 1 wt. %. The (HLB) value is calculated as twenty times the molecular weight of the hydrophilic portion of the polysiloxane divided by the total molecular weight of the polysiloxane. For example, polyethylene oxide (PEO; —CH$_2$CH$_2$O—) groups and hydroxymethyl (—CH$_2$OH) groups contribute to the hydrophilic portion of the polysiloxane. In the case of polydisperse molecules, such as the polysiloxanes described herein, the term "molecular weight" refers to the absolute number average molecular weight (in units of Daltons) of the monomer as determined by $^1$H NMR end-group analysis (NMR). Similarly, the values of m, n, p, q, and h are average values as determined by NMR. In various examples, the HLB value of the polysiloxane is at least 6, 7, or 8, and up to about 10, 11, or 12.

Throughout this disclosure, when a series of lower limit ranges and a series of upper limit ranges are provided, all combinations of the provided ranges are contemplated as if each combination were specifically listed. For example, in the listing of HLB values above, all 9 possible HLB ranges are contemplated (i.e. 6-10, 6-11 . . . 8-11, and 8-12). Also, throughout this disclosure, when a series of values is presented with a qualifier preceding the first value, the qualifier is intended to implicitly precede each value in the series unless context dictates otherwise. For example, for the above HLB values, it is intended that the qualifier "at least" implicitly precedes both 7 and 8, and the qualifier "to about" implicitly precedes both 11 and 12. In some examples, the HEMA-compatible polysiloxane has an average hydroxyl group content of from about 1, 2, 3, or 4 wt. % up to about 5, 7, 10, or 15 wt. %, wherein the wt. % of the —OH groups is based on the average molecular weight of the polysiloxane.

While the HEMA-compatibility of a polysiloxane of Formula I is determined using a test formulation in the manner described above, the polymerizable compositions used to make the contact lenses described herein may comprise monomers in addition to hydroxyalkyl methacrylate provided that the composition comprises at least 25 wt. % of at least one hydroxyalkyl methacrylate, and at least 20 wt. % of at least one HEMA-compatible bifunctional polysiloxane of Formula I having an HLB value of at least 5 and/or comprising a hydroxyl group content of at least 1 wt. %. As used herein, a wt. % of a monomer (i.e. the hydroxyalkyl methacrylate, the HEMA-compatible polysiloxane, and any other polymerizable component of the polymerizable composition) is based on the total weight of polymerizable monomers in the composition, i.e. excluding diluents and any other non-polymerizable component.

The hydroxyalkyl methacrylate may be any lower hydroxyalkyl methacrylate suitable for use in contact lenses. In specific examples, the hydroxyalkyl methacrylate is selected from HEMA, 2-hydroxybutyl methacrylate (HOB), 2-hydroxypropyl methacrylate (HOP), and combinations thereof. For example, in the case of a composition that comprises 10 wt. % HOB and 15 wt. % HOP, the composition is said to comprise 25 wt. % of at least one hydroxyalkyl methacrylate. In other words, the composition may comprise a combination of hydroxyalkyl methacrylates provided that their combined total is at least 25 wt. %. Similarly, the composition may comprise a combination of two or more HEMA-compatible polysiloxanes of Formula I having an HLB value of at least 5 and/or comprising a hydroxyl group content of at least 1 wt. %, provided that their combined total in the composition is at least 20 wt. %. Thus, reference to "a", "an" or "the" monomer of a particular type (e.g. "the HEMA-compatible polysiloxane of Formula I" or "a hydroxyalkyl methacrylate") is meant to encompass "one or more" of said type of monomer unless context dictates otherwise. In various examples, the polymerizable composition comprises at least 30, 35 or 40 wt. % of the hydroxyalkyl methacrylate and at least 25, 30, or 35 wt. % of the HEMA-compatible polysiloxane of Formula I. In a specific example, the polymerizable composition comprises HEMA. In another example, the polymerizable composition comprises a combination of HEMA and HOB. Addition of HOB to certain polymerizable compositions may improve dry-delensability of the polymeric lens body and/or improve optical clarity of the resulting lens, as demonstrated in Example 4 below.

Other monomers may be included in the polymerizable composition in addition to the hydroxyalkyl methacrylate and the HEMA-compatible polysiloxane of Formula I. Exemplary additional monomers include N-vinyl-N-methyl acetamide (VMA), N-vinyl pyrrolidone (NVP), 1,4-butanediol vinyl ether (BVE), ethylene glycol vinyl ether (EGVE), diethylene glycol vinyl ether (DEGVE), N,N-dimethylacrylamide (DMA), methyl methacrylate (MMA), ethoxyethyl methacrylamide (EOEMA), ethylene glycol methyl ether methacrylate (EGMA), isobornyl methacrylate (IBM), glycerol methacrylate (GMA), methacrylic acid (MA), acrylic acid (AA) or any combination of two or more of the foregoing additional monomers. In a specific example, the polymerizable composition comprises from about 0.1, 0.5, or 1 wt. % up to about 2, 3, or 5 wt. % MA or AA.

A polymerizable siloxane that is not necessarily a HEMA-compatible polysiloxane of Formula I, as defined above, may also be included in the polymerizable composition up to an amount in which the additional polymerizable siloxane remains miscible such that the resulting lens is optically clear. Examples of additional polymerizable siloxanes that may be included in the polymerizable composition are 3-[tris(trimethylsiloxy)silyl]propyl methacrylate ("TRIS"), 3-methacryloxy-2-hydroxypropyloxy)propylbis(trimethylsiloxy)methylsilane ("SiGMA"), methyldi(trimethylsiloxy) sylylpropylglycerolethyl methacrylate ("SiGEMA"), and monomethacryloxypropyl functional polydimethylsiloxanes such as MCR-M07 and MCS-M11, all available from Gelest (Morrisville, Pa., USA). Other polymerizable siloxanes are known in the field (see e.g. U.S. Pat. No. 7,572,841, U.S. Pat. No. 5,998,498, U.S. Pat. No. 5,965,631, U.S. Pat. Pub. No. 2006/0063852, U.S. Pub. No. 2007/0296914, U.S. Publ. No. 2009/0299022, U.S. Pat. No. 6,310,169, and U.S. Pat. No. 6,867,245, each incorporated herein by reference).

Although the HEMA-compatible polysiloxane of Formula I comprises two polymerizable groups, and thus functions in the polymerizable composition as a cross-linker, an additional cross-linker may be included in the polymerizable composition to achieve a hydrogel having the physical properties suitable for contact lenses. Various cross-linkers are known in the art. Exemplary cross-linkers are triethylene glycol dimethacrylate (TEGDMA) and ethylene glycol dimethacrylate (EGDMA).

Typically the polymerizable composition will additionally include a coloring agent such as a tint (e.g. Vat Blue 6) or a polymerizable dye (e.g. RB19-HEMA, RB246, and the like). In specific examples, the polymerizable composition consists of: (a) the HEMA-compatible polysiloxane of Formula I, (b) the hydroxyalkyl methacrylate, (c) a monomer selected from methacrylic acid, or acrylic acid, or glycerol methacrylate, or a combination thereof, and optionally (d) a cross-linker agent and/or a polymerizable dye, and no other polymerizable components.

Typically, the contact lenses described herein will have an oxygen permeability (Dk) of at least 35, 40, or 45 barrers, as measured using standard methods in the industry, such as by the method described by Chhabra et al. (2007), *A single-lens polarographic measurement of oxygen permeability (Dk) for hypertransmissible soft contact lenses*. Biomaterials 28: 4331-4342. The equilibrium water content (EWC) of the contact lenses will be in the range of about 30 to 70 wt. %, and typically at least 35, 40, or 45 wt. % and up to about 50, 55, or 60 wt. %. To measure EWC, excess surface water is wiped off of the lens and the lens is weighed to obtain the hydrated weight. The lens is dried in an oven at 80° C. under a vacuum, and weighed. The weight difference is determined by subtracting the weight of the dry lens from the weight of the hydrated lens. The % EWC of the lens is =(weight difference/hydrated weight)×100. In various examples, the HEMA-compatible polysiloxane has an average elemental silicon content of at least 8, 10, 12, 14, 16, 18, or 20 wt. % relative to the average molecular weight of the HEMA-compatible polysiloxane.

In one example of the HEMA-compatible polysiloxane of Formula I, k is 1 and X is $CH_2CH(OH)CH_2O$. As used throughout this description, a moiety or moieties indicated parenthetically in a formula, e.g. (H), (OH), ($CH_2OH$), ($CH_2CH_3$), etc., are substituents of the first non-hydrogen atom not within parenthesis to the left of the moiety or moieties in the formula. Examples 2 and 3 below describe a method of making a polysiloxane of Formula I wherein k is 1, X is $CH_2CH(OH)CH_2O$, and Z is $C_3$ alkylene. As used herein with respect to Z of Formula I, alkylene refers to a linear, non-substituted hydrocarbon chain (i.e. $C_2H_4$, $C_3H_6$, $C_4H_8$, etc.). In another example of the HEMA-compatible polysiloxane of Formula I, k is 0. Example 1 below describes a method of making a polysiloxane intermediate that can be used to make a polysiloxane of Formula I wherein k=0 and Z is a $C_3$ alkylene. It will be appreciated that other reagents can be used to provide desired X and Z groups. For example, 1,3 bis(4-methacryloxybutyl)tetramethyldisiloxane (CAS 70877-11-1) may be substituted for X-22-164 in Example 1 below to provide an intermediate polysiloxane which can be used to make a polysiloxane of Formula I where Z is $C_4$ alkylene. In another example, 1-pentanol, 5,5'-(1,1,3,3-tetramethyl-1,3-disiloxanediyl)bis (CAS 113425-99-3) is reacted with methacryloyl chloride in the presence of triethylamine to provide 1,3 bis(4-methacryloxypentyl)tetramethyldisiloxane, which may substituted for X-22-164 in Example 1 below to provide an intermediate polysiloxane which can be used to make a polysiloxane of Formula I where Z is $C_5$ alkylene.

In one aspect of the disclosure, provided is a polysiloxane intermediate of structure (2):

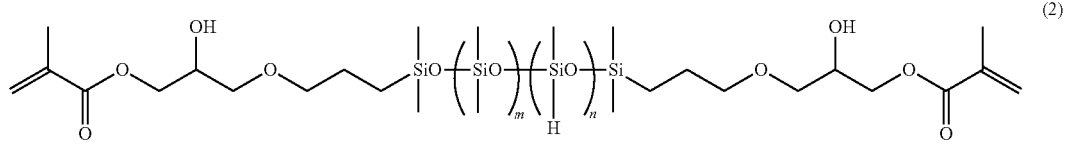

(2)

wherein m is 0 or an integer of at least 1, and n is an integer of at least 1. A polysiloxane intermediate of structure (2) may be used in a hydrosilylation reaction as an intermediate in the preparation of HEMA-compatible polysiloxanes disclosed herein where and X is $CH_2CH(OH)CH_2O$, as well as other bifunctional polysiloxanes where the presence of hydroxyl groups is desirable. The polysiloxane intermediate may be prepared using the methods described in Example 2, where reactants are selected to provide the desired ratio and number of m and n units.

In another example of the HEMA-compatible polysiloxane of Formula I, n and h are both integers of at least 1. In such example, the side chains of the n siloxane units are different from that of the h siloxane units. For example, referring to Formula I, when i and j are 0, then $R_1$ is methyl and/or at least one of p and q is at least 1, and when j is 1 and A is O, then i is 1 and $R_1$ is methyl and/or p and q are both 0 or at least 1 or at least one of p and q is at least 2 and/or D is a $C_3$-$C_6$ alkylene optionally substituted with one or more groups selected from hydroxyl, methoxy, methyl and ethyl. Such polysiloxanes having 2 different siloxane side chains may be referred to as "hybrid" polysiloxanes. An example of a hybrid polysiloxane is provided in Example 4, which is prepared using the polysiloxane intermediate of structure (1) shown in Example 1.

In the HEMA-compatible polysiloxane of Formula I, L is either methyl or a side chain that is the same as an opposite side chain on the same silicon atom as L, and Q is either methyl or a side chain that is the same as an opposite side chain on the same silicon atom as Q. In other words, the polysiloxane of Formula I may comprise h or n siloxane units having two identical side chains on each h or n siloxane unit, as opposed to a single side-chain and a methyl group. Such polysiloxanes may be referred to as "symmetrical" polysiloxanes. A symmetrical polysiloxane can be made, for example, by replacing the tetramethylcyclotetrasiloxane reagent (LS8600) used in Examples 1 and 2 to make intermediate siloxanes of structures (1) and (2), respectively, with cyclotetrasiloxane (CAS No 293-51-6). In one example, where n of Formula I is at least 1 and L is a side chain that is the same as an opposite side chain on the same silicon atom as L (i.e. a symmetrical siloxane), h is 0. Similarly, in another example, where h of Formula I is at least 1 and Q is a side chain that is the same as an opposite side chain on the same silicon atom as Q, n is 0.

A polysiloxane having desired hydrophilic and/or hydroxyl-containing side-chains can be prepared by methods known in the art. For example, hydrosilylation of an intermediate polysiloxane (e.g. such as the intermediate polysiloxane of Structure 1 or Structure 2 of Example 1 and 2 below) with an allyl- or allyl ether-terminated reagent can provide desired side-chains. Exemplary allyl ether-terminated reagents include: 2-allyoxyethanol, which provides a side chain in which A of Formula I is 0, and D is $C_2H_4$; 2-(allyloxymethyl)-2-ethyl-1,3-propanediol, which provides a side chain in which A of Formula I is 0, and D is $CH_2C(CH_2OH)(CH_2CH_3)CH_2$; and 3-allyloxy-1,2-propanediol, which provides a side chain in which A of Formula I is O, and D is $CH_2CH(OH)CH_2$. An exemplary allyl-terminated reagent is 7-octene-1,2-diol, which provides a side chain in which A of Formula I is $CH_2$ and D is $CH_2CH(OH)CH_2$. In examples where n of Formula I is at least 1, and both p and q are at least 1, the order of the p and q units may be random. For example, the n side chain may be provided by hydrosilylation of a polysiloxane intermediate with an allyl ether-terminated random copolymer of ethylene oxide and propylene oxide having an ethyloxide/propylene oxide molar ratio to provide the desired ratio of p to q units. Additional allyl- or allyl ether-terminated reactants for the hydrosilyation reaction are known in the art which will provide desired side chain groups of a HEMA-compatible polysiloxane having a structure of Formula I. In various examples, the sum of m+n+h is less than 50, 40, 30 or 20. In some examples, m is an integer of less than 60, 50, 30, 20, or 10. In a particular example, the polysiloxane comprises no dimethylsiloxane units, i.e. m=0. In another example, $R_1$ of the HEMA-compatible polysiloxane of Formula I is a methyl group and the hydroxyl content of the polysiloxane is at least 1 wt. %.

Optically clear contact lenses can be made from the HEMA-compatible polysiloxanes described herein using curing and other processing methods known in the field. An exemplary method comprises preparing a polymerizable composition comprising at least 25 wt. % of at least one hydroxyalkyl methacrylate, at least 20 wt. % of a HEMA-compatible bifunctional polysiloxane, a polymerization initiator, and optionally 1 to 65 wt. % diluent. The polymerizable composition is filled into a contact lens mold, which is typically made from a thermoplastic polymer such as polypropylene. Typically, a first mold member defining the front surface of the contact lens, referred to as a "female mold member", is filled with an amount of the polymerizable composition sufficient to form a single polymeric lens body. A second mold member defining the back (i.e. eye-contacting) surface of the contact lens, referred to as the "male mold member", is coupled to the female mold member to form a mold assembly having a lens-shaped cavity with the amount of polymerizable composition therebetween. The polymerizable composition within the contact lens mold assembly is then polymerized using any suitable curing method. Typically, the polymerizable composition is exposed to polymerizing amounts of heat or ultraviolet light (UV). In the case of UV-curing, also referred to as photopolymerization, the polymerizable composition typically comprises a photoinitiator such as benzoin methyl ether, 1-hydroxycyclohexylphenyl ketone, Darocur or Irgacur (available from Ciba Specialty Chemicals). Photopolymerization methods for contact lenses are described in U.S. Pat. No. 5,760,100. In the case of heat-curing, also referred to as thermal curing, the polymerizable composition typically comprises a thermal initiator. Exemplary thermal initiators include 2,2'-azobis(2,4-dimethylpentanenitrile) (V-52), 2,2'-Azobis(2-methylpropanenitrile) (V-64), and 1,1'-azo bis (cyanocyclohexane) (V-88). In some examples, the polymerizable composition is thermally cured in a nitrogen oven. In a specific example, the polymerizable composition comprises V-52 and is cured at about 80° C. in air for about 1 hour.

At the completion of curing, the polymerized material between the mold members of the mold assembly has the shape of a contact lens, and is referred to herein as a "polymeric lens body". The male and female mold members are demolded, i.e. separated, and the polymeric lens body is removed, i.e. delensed, from the mold member to which it is adhered. These processes are referred to as demolding and delensing, respectively, and a variety of such methods are known to those of ordinary skill in the field. In some methods, the demolding and delensing processes can comprise a single process step, such as when the molds are separated using a liquid which also removes the polymeric lens body from the mold. In other methods, such as when a dry-demolding process is used, the polymeric lens body typically remains on one of the mold members and is delensed in a subsequent process step. Delensing can also be a wet or dry process. In one example, delensing is carried out by a "float off" method in which the mold member to which a polymeric lens body is adhered is immersed in water. The water may optionally be heated (e.g. up to about 100° C.). Typically, the polymeric lens bodies float off of the mold members in about ten minutes. In a specific example, the polymeric lens body is dry-delensed from the mold prior to hydrating the polymeric lens body. Dry delensing can be carried out manually, for example using tweezers to remove the polymeric lens bodies from the mold member, or they can be removed using an automated mechanical process, such as described in U.S. Pat. No. 7,811,483. Additional demolding and delensing methods for silicone hydrogel contact lenses are described in U.S. Pat. Publ. No. 2007/0035049.

After delensing, the polymeric lens body is optionally washed to remove unreacted or partially reacted ingredients from the polymeric lens body and to hydrate the polymeric lens body. In a specific example, the polymeric lens body is washed in a washing liquid free of volatile organic solvents (e.g. methanol, ethanol, chloroform, etc.), and all liquids used to wash the polymeric lens body are free of volatile organic solvents. This type of washing may also be referred to herein as "organic solvent-free extraction" where "organic solvent" refers to volatile organic solvents. For example, a washing step that uses aqueous solutions of surfactants such as Tween 80, without any volatile organic solvents, is considered to be a volatile organic solvent-free extraction. In a further example, the polymeric lens body is not contacted by any volatile organic solvents during the manufacturing process (i.e. from the time curing of the polymeric lens body is complete until the time it is sealed in its final packaging). While the polymerizable compositions described herein can be used to make polymeric lenses bodies that can be washed without the use of volatile organic solvents, if desired, they can also be washed with organic solvents. Thus, washing steps can include contacting the polymeric lens body with a volatile organic solvent, such as a lower alcohol (e.g. methanol, ethanol, etc.), contacting the polymeric lens body with aqueous liquids that may or may not contain a volatile organic solvents, solutes, or combinations thereof. Exemplary washing methods are described in U.S. Pat. Publ. No. 2007/0296914 and in Example 3 below.

After washing, and any optional surface modifications, the hydrated polymeric lens body is typically placed into a blister package, glass vial, or other appropriate container, all referred to herein as "packages", which contains a packaging solution, which is typically a buffered saline solution such as phosphate- or borate-buffered saline. In some examples, a polymeric lens body that has been dry-delensed may not require a washing step, and thus may be dry when contacted with a packaging solution, i.e. it hydrates upon packaging. The packaging solution may optionally contain additional ingredients such as a comfort agent, a hydrophilic polymer, a surfactant or other additive that prevents the lens from sticking to the container, etc. The package is sealed, and the sealed polymeric lens body is sterilized by sterilizing amounts of radiation, including heat or steam, such as by autoclaving, gamma radiation, e-beam radiation, ultraviolet radiation, etc. The final product is a sterile, packaged optically clear silicone hydrogel contact lens.

The following Examples illustrate certain aspects and advantages of the present invention, which should be understood not to be limited thereby.

Example 1

Preparation of Polysiloxane Intermediate 101.08 g of octamethylcyclotetrasiloxane (LS8620, Shin-Etsu Chemical), 43.70 g of 1,3,5,7-tetramethylcyclotetrasiloxane (LS8600, Shin-Etsu Chemical) and 29.30 g of 1,3-bis(3-methacryloxypropyl)-1,1,3,3-tetramethyldisiloxane (X-22-164, Shin-Etsu Chemical) were added into 500 ml kjeldahl (eggplant-shaped) flask. To this solution 0.30 g of trifluoromethanesulfonic acid (Wako Pure Chemical Industries) was added and stirred at 35° C. for 24 h. After that 0.3729 g of magnesium oxide (light) (Wako Pure Chemical Industries) and 150 ml of hexane (super dehydrated) were added and stirred for 1 h at room temperature. The reaction mixture was suction filtered through Celite No. 545 (Wako Pure Chemical Industries) and No. 5A KIRIYAMA filter paper. The filtrate was evaporated and vacuum-dried at 35° C. Afterward to the crude mixture 170 g of methanol was added. The solution was vigorously stirred and then centrifuged at 7000 rpm, 10 min and 5° C. After that an upper layer was removed. This operation was repeated 3 times. The lower layer was evaporated and vacuum-dried at 35° C. The reaction yielded 115.79 g of an intermediate siloxane of structure (1):

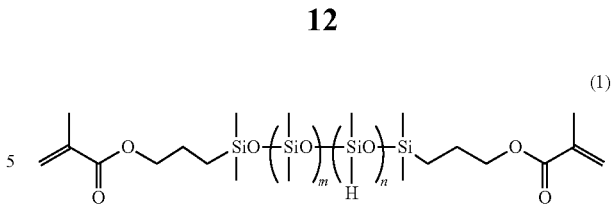

Example 2

Preparation of Polysiloxane Intermediate 18.5099 g of 1,3-bis(3-glycidyloxypropyl)tetramethyldisiloxane (Aldrich), 26.3200 g of methacrylic acid (Tokyo Chemical Industry Co., LTD.) and 0.1727 g of p-methoxyphenol (Wako Pure Chemical Industries) were added into 100 ml eggplant-shaped flask. To this solution 2.2067 g of sodium methacrylate (Aldrich) was added and refluxed at 100° C. for 4 h. After that to the reaction mixture 50 ml of toluene (Wako Pure Chemical Industries) was added at r.t. and the organic layer was washed with 0.5M NaOH aq. (50 ml×5) and Brine (50 ml×3). The organic layer was dried with $Na_2SO_4$ and filtrated. To the reaction mixture 0.27 g of 1% 2,6-di-t-butyl-4-methylphenol (Wako Pure Chemical Industries) in toluene was added and then evaporated, and vacuum-dried at 35° C. The reaction yielded 24.67 g of 1,3-bis(3-methacryloxy-2-hydroxypropyoxypropyl)tetramethyldisiloxane (CAS No. 71223-24-0), referred to herein as D-HMS.

121.90 g of octamethylcyclotetrasiloxane (LS8620, Shin-Etsu Chemical), 13.18 g of 1,3,5,7-tetramethylcyclotetrasiloxane (LS8600, Shin-Etsu Chemical), 11.72 g D-HMS and Chloroform (stabilizer:amylene, Wako Pure Chemical Industries) were added into 300 ml eggplant-shaped flask. To this solution 0.32 g of trifluoromethanesulfonic acid (Wako Pure Chemical Industries) was added and stirred at 35° C. for 25 h. 0.3532 g of magnesium oxide (light) (Wako Pure Chemical Industries) and 50 g of Chloroform (stabilizer:amylene, Wako Pure Chemical Industries) were added to the reaction mixture, and stirred for 1 h. After that a suction filtration was conducted through Celite No. 545 (Wako Pure Chemical Industries) and KIRIYAMA filter paper No. 5A. and then evaporated, vacuum-dried. To this crude 13.5 g of acetone and 135 g of methanol were added and vigorously stirred, then centrifuge (7500 rpm, 5° C., 10 min) was carried out. An upper layer was removed. This operation was repeated a total of 4 times. After that the solution was evaporated and vacuum-dried. The reaction yielded 111.63 g of a polysiloxane intermediate of structure (2) shown above.

Example 3

Preparation of H10P1-DIO-10K 20.01 g of H10A-DIO-15k, 5.83 g of 2-(Allyloxy) ethanol (Wako Pure Chemical Industries), 40.01 g of 2-Propanol, Super Dehydrated (Wako Pure Chemical Industries), 0.30 g of 10% potassium acetate (Wako Pure Chemical Industries) in ethanol and 0.23 g of 1% 2,6-di-t-butyl-4-methylphenol (Wako Pure Chemical Industries) in 2-propanol were added into 300 ml eggplant-shaped flask. To this solution 0.60 g of 1% hydrogen hexachloroplatinate (IV) hexahydrate in 2-propanol was added and stirred at 50° C. for 7 h. After that the reaction mixture was evaporated at 35° C. To this mixture, 27 g of acetone and 13 g of DI water were added, and then vigorously stirred. After centrifugation (5000 rpm, 5° C., 10 min), an upper layer was removed. This action was repeated total four times. To the solution, 0.14 g of 1% 2,6-di-t-butyl-4-methylphenol (Wako Pure Chemical Industries) in 2-propanol, 0.06 g of 1% p-Methoxyphenol in 2-propanol and 15 g of 2-propanol were added, evaporated and vacuum-dried at 35° C. In addition 0.08 g of 1%

2,6-di-t-butyl-4-methylphenol (Wako Pure Chemical Industries) in 2-propanol, 0.05 g of 1% p-Methoxy-phenol in 2-propanol were added, then evaporated and vacuum-dried at 35° C. The reaction yielded 22.25 g of a polysiloxane macromer of structure (3) wherein m is 113, and n is 15.

Two additional hybrid polysiloxanes of structure (4) were prepared using similar methods with reactant ratios varied to provide the following: H40P161-3K, in which m is 16, n is 2, and h is 6; and H60P161-6K, in which m is 20, n is 4, and h is 20.

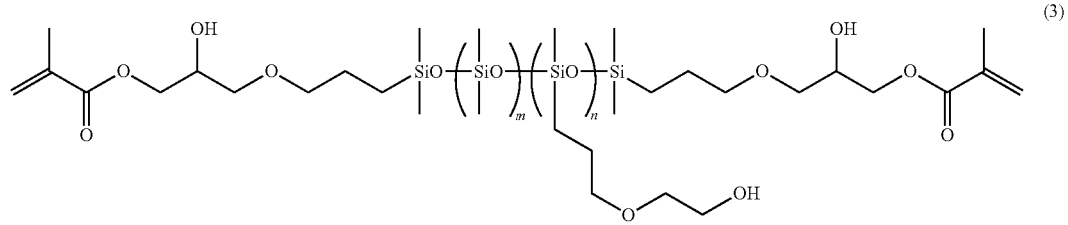

(3)

Example 4

Preparation of Hybrid Polysiloxanes 20.01 g of the intermediate siloxane of the above structure (1), 12.40 g of 2-(allyloxy)ethanol (Wako Pure Chemical Industries), 30.35 g of hydroxyl polyethylene glycol allyl ether having an average molecular weight of about 750 (Uniox PKA5004, NOF Corporation), 60.00 g of 2-propanol (super dehydrated) (Wako Pure Chemical Industries), 0.20 g of 10% potassium acetate (Wako Pure Chemical Industries) in ethanol and 0.41 g of 1% 2,6-di-t-butyl-4-methylphenol (hereinafter BHT) (Wako Pure Chemical Industries) in 2-propanol were added into 300 ml kjeldahl (eggplant-shaped) flask. To this solution 0.39 g of 1% H2PtCl6/6H2O/ IPA was added and stirred at 50° C. for 20.5 h. After that 0.39 g of 1% sodium hydrogen carbonate aq. was added and stirred for 1 h at room temperature. Afterward the reaction mixture was evaporated at 35° C. The crude mixture was dissolved into 100 g of dichloromethane and 70 g of DI water was added. The solution was vigorously stirred and then centrifuged at 1500 rpm, 5 min and 20° C. Then an upper layer was removed. This operation was repeated 17 times. The organic layer was dried with sodium sulfate and filtrated. The filtrate was evaporated and vacuum-dried at 35° C. for 2 h. To this solution 0.18 g of 1% BHT in IPA and 0.18 g of 1% p-methoxyphenol in IPA were added and then the solution was evaporated and vacuum-dried at 35° C. The reaction yielded 36.08 g of a hybrid polysiloxane designated H40P161-6K having structure (4) shown below, in which m is 29, n is 4, and h is 13.

Example 5

Preparation of Contact Lenses Using Hybrid Polysiloxanes

The hybrid polysiloxanes prepared in Example 4 were used to make the contact lens formulations shown in Table 1:

TABLE 1

| Component | Units | | |
|---|---|---|---|
| | A | B | C |
| H40P161-3K | 40 | | |
| H40P161-6K | | 40 | |
| H60P161-6K | | | 40 |
| HEMA | 60 | 60 | 45 |
| HOB | | | 15 |
| MA | 3 | 3 | 3 |
| EGDMA | 0.5 | 0.5 | |
| TEGDMA | | | 1 |
| V52 | 0.8 | 0.8 | 0.8 |
| Water | 20 | 15 | 30 |

Formulations A-C of Table 1 were each filled into polypropylene contact lens molds. Formulations A and B were air cured at 80° C. for 1 hour. The molds were opened and the mold half retaining the cured polymeric lens body was removed from the mold and immersed without prior hydration directly into a blister containing PBS, and autoclaved. The resulting lenses were slightly hazy. Formulation C was

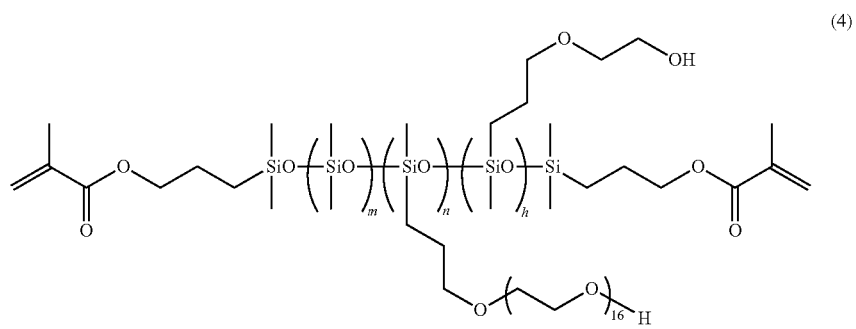

(4)

air cured at 100° C. for 1 hour. The resulting lens was easier to dry-delense from the mold than the lenses of Formulations A and B. The polymeric lens body of Formulation C was packaged without prior hydration into a blister containing PBS and autoclaved. The resulting lens was clear.

Example 6

Preparation of Polysiloxane Macromers Bearing OH-Containing Side Chains

Macromers having structures of Formula (I) wherein $R_2$ is a methyl group, k is 1 or 0, X is $CH_2CH(OH)CH_2$, Z is a $C_3$ alkylene, L and Q are both methyl, j is 1, n is 0, and A is O, were prepared in a similar manner as the polysiloxane of Example 3 with reactants adjusted to provide k, m, h, and D values as indicated in Table 3. Each macromer listed in rows numbered 1 to 6 of Table 3 below were used in the formulation shown in Table 2 below. Each formulation was filled into polypropylene contact lens molds and air cured at 80° C. for 1 hour. The molds were opened and the mold half retaining the cured polymeric lens body was immersed into room temperature water for 20 minutes. During this time, the lenses hydrated and detached from the mold half. The lenses were then placed into fresh water for another 20 minutes at room temperature, placed into contact lens blisters containing 1.8 ml PBS, sealed and autoclaved. The resulting lenses were not optically clear; however, it is expected that increasing % OH content and/or HLB value of the macromers, such as the macromers shown in rows 7 to 18 of Table 3, will result in optically clear contact lenses using the formulation of Table 2.

TABLE 2

| Component | Unit Parts by weight |
|---|---|
| Macromer | 40 |
| HEMA | 60 |
| MA | 1.8 |
| EGDMA | 0.1 |
| V52 | 0.5 |
| Water | 25 |

Although the disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

A number of publications and patents have been cited hereinabove. Each of the cited publications and patents are hereby incorporated by reference in their entireties.

The invention further provides:

1. An optically clear silicone hydrogel contact lens comprising: a hydrated polymeric lens body that is the reaction product of a polymerizable composition comprising: a) at least 25 wt. % of at least one hydroxyalkyl methacrylate; and b) at least 20 wt. % of at least one HEMA-compatible polysiloxane represented by Formula I (above) wherein $R_1$ and $R_2$ are independently selected from either hydrogen or a methyl group, X is $CH_2CH_2O$ or $CH_2CH(OH)CH_2O$, k is an integer of 0 or 1, Z is a $C_2$-$C_{10}$ alkylene, m is an integer of 0 to 160, n is an integer of 1 to 75, p is an integer of 0 to 40, q is an integer of 0 to 20, h is an integer of 0 to 75, j is an integer of 0 or 1, A is O or $CH_2$, i is an integer of 0 or 1, D is a $C_2$-$C_6$ alkylene optionally substituted with one or more groups selected from hydroxyl, methoxy, methyl, and ethyl, L is either methyl or a side chain that is the same as an opposite side chain on the same silicon atom as L, Q is either methyl or a side chain that is the same as an opposite side chain on the same silicon atom as Q, where the sum of m, n, and h is at least 5, wherein the HEMA-compatible polysiloxane has an HLB value of at least 5 and/or has a hydroxyl group content of at least 1 wt. %, and wherein when Z is a $C_3$ alkylene, a) X is $CH_2CH(OH)CH_2O$ and/or b) h is at least 1 and/or c) L is said side chain that is the same as an opposite side chain on the same silicon atom as L, wherein for (b) alone, when i and j are 0, then $R_1$ is methyl and/or the at least one of p and q is at least 1, and when j is

TABLE 3

| Macromer | k | m | h | D | % OH | HLB |
|---|---|---|---|---|---|---|
| 1 PD10-15K | 0 | 113 | 15 | $CH_2CH(OH)CH_2$ | 5.3% | 2.32 |
| 2 H10P1-15K | 0 | 113 | 15 | $C_2H_4$ | 5.4% | 1.62 |
| 3 DMB10-15K | 0 | 113 | 15 | $CH_2C(CH_2OH)(CH_2CH_3)CH_2$ | 4.9% | 2.22 |
| 4 PD10-DIO-15K | 1 | 113 | 15 | $CH_2CH(OH)CH_2$ | 5.4% | 2.52 |
| 5 H10P1-DIO-15K | 1 | 113 | 15 | $C_2H_4$ | 5.5% | 1.83 |
| 6 DMB10-DIO-15K | 1 | 113 | 15 | $CH_2C(CH_2OH)(CH_2CH_3)CH_2$ | 5.0% | 2.42 |
| 7 Mac-A | 0 | 60 | 30 | $CH_2CH(OH)CH_2$ | 11.1% | 5.10 |
| 8 Mac-B | 0 | 60 | 30 | $C_2H_4$ | 11.8% | 3.72 |
| 9 Mac-C | 0 | 60 | 30 | $CH_2C(CH_2OH)(CH_2CH_3)CH_2$ | 9.7% | 4.60 |
| 10 Mac-D | 1 | 60 | 30 | $CH_2CH(OH)CH_2$ | 11.3% | 5.32 |
| 11 Mac-E | 1 | 60 | 30 | $C_2H_4$ | 12.0% | 3.97 |
| 12 Mac-F | 1 | 60 | 30 | $CH_2C(CH_2OH)(CH_2CH_3)CH_2$ | 9.8% | 4.80 |
| 13 Mac-A-NDM | 0 | 0 | 30 | $CH_2CH(OH)CH_2$ | 19.0% | 8.72 |
| 14 Mac-B-NDM | 0 | 0 | 30 | $C_2H_4$ | 21.5% | 6.78 |
| 15 Mac-C-NDM | 0 | 0 | 30 | $CH_2C(CH_2OH)(CH_2CH_3)CH_2$ | 15.4% | 7.31 |
| 16 Mac-D-NDM | 1 | 0 | 30 | $CH_2CH(OH)CH_2$ | 19.3% | 9.10 |
| 17 Mac-E-NDM | 1 | 0 | 30 | $C_2H_4$ | 21.8% | 7.23 |
| 18 Mac-F-NDM | 1 | 0 | 30 | $CH_2C(CH_2OH)(CH_2CH_3)CH_2$ | 15.6% | 7.62 |

1 and A is O, then i is 1 and $R_1$ is methyl and/or p and q are both 0 or at least 1 or at least one of p and q is at least 2 and/or D is $C_3$-$C_6$ alkylene optionally substituted with one or more groups selected from hydroxyl, methoxy, methyl and ethyl. p and q can be the same or different with respect to the integer.

2. The contact lens of 1, wherein the HEMA-compatible polysiloxane has an HLB value of at least 7.

3. The contact lens of 1 or 2, wherein the HEMA-compatible polysiloxane has a hydroxyl group content of at least 4 wt. %.

4. The contact lens of any one of 1-3, wherein m of Formula I is an integer of less than 60.

5. The contact lens of any one of 1, 2, or 4, wherein when $R_1$ of Formula I is a methyl group the hydroxyl group content of the HEMA-compatible polysiloxane is at least 1 wt. %.

6. The contact lens of any one of 1-5, wherein X is $CH_2CH(OH)CH_2O$.

7. The contact lens of any one of 1-6, wherein the HEMA-compatible siloxane is a hybrid polysiloxane wherein n is an integer of at least one and h is an integer of at least one.

8. The contact lens of any one of 1-7, wherein the polymerizable composition comprises from about 0.1 wt. % to about 5 wt. % methacrylic acid or acrylic acid.

9. The contact lens of any one of 1-8, wherein the polymerizable composition comprises at least 35 wt. % of the hydroxyalkyl methacrylate.

10. The contact lens of any one of 1-9, wherein the hydroxyalkyl methacrylate comprises 2-hydroxyethyl methacrylate (HEMA).

11. The contact lens of 10, wherein the hydroxyalkyl methacrylate additionally comprises 2-hydroxybutyl methacrylate (HOB).

12. The contact lens of any one of 1-11 having an equilibrium water content (EWC) of about 40 wt. % to about 55 wt. %.

13. A method of manufacturing the optically clear contact lens of any one of 1-12, comprising: a) polymerizing the polymerizable composition to form the polymeric lens body; and b) hydrating the polymeric lens body.

14. The method of 13, wherein the polymerizable composition is cured in a mold to form the polymeric lens body, and wherein the polymeric lens body is dry-delensed from the mold prior to hydrating the polymeric lens body.

15. The method of 14, wherein the polymeric lens body is dry when contacted with a packaging solution.

16. A HEMA-compatible polysiloxane having the structure of Formula I (above) wherein $R_1$ and $R_2$ are independently selected from either hydrogen or a methyl group, X is $CH_2CH_2O$ or $CH_2CH(OH)CH_2O$, k is an integer of 0 or 1, Z is a $C_2$-$C_{10}$ alkylene, m is an integer of 0 to 160, n is an integer of 1 to 75, p is an integer of 0 to 40, q is an integer of 0 to 20, h is an integer of 0 to 75, j is an integer of 0 or 1, A is O or $CH_2$, i is an integer of 0 or 1, D is a $C_2$-$C_6$ alkylene optionally substituted with one or more groups selected from hydroxyl, methoxy, methyl, and ethyl, L is either methyl or a side chain that is the same as an opposite side chain on the same silicon atom as L, Q is either methyl or a side chain that is the same as an opposite side chain on the same silicon atom as Q, where the sum of m, n, and h is at least 5, wherein the HEMA-compatible polysiloxane has an HLB value of at least 5 and/or a hydroxyl group content of at least 1 wt. %, wherein when $R_1$ is a methyl group, the hydroxyl group content is at least 1 wt. %, and wherein when Z is a $C_3$ alkylene, a) X is $CH_2CH(OH)CH_2O$ and/or b) h is at least 1 and/or c) L is said side chain that is the same as an opposite side chain on the same silicon atom as L, wherein for (b) alone, when i and j are 0, then $R_1$ is methyl and/or the at least one of p and q is at least 1, and when j is 1 and A is O, then i is 1 and $R_1$ is methyl and/or p and q are both 0 or at least 1 or at least one of p and q is at least 2 and/or D is $C_3$-$C_6$ alkylene optionally substituted with one or more groups selected from hydroxyl, methoxy, methyl and ethyl.

17. The HEMA-compatible polysiloxane of 16, wherein X is $CH_2CH(OH)CH_2O$.

18. The HEMA-compatible polysiloxane of 16 or 17, wherein Z is a $C_3$ alkylene.

19. The HEMA-compatible polysiloxane of any one of 16-18, wherein m is an integer of less than 60.

20. A compound of structure 2 (above) wherein m is 0 or an integer of at least 1, and n is an integer of at least 1.

21. A method of making a polysiloxane comprising hydrosilylation of the compound of 20.

The invention claimed is:

1. An optically clear silicone hydrogel contact lens comprising:
   a hydrated polymeric lens body that is the reaction product of a polymerizable composition comprising:
   a) at least 25 wt. % of at least one hydroxyalkyl methacrylate; and
   b) at least 20 wt. % of at least one HEMA-compatible polysiloxane represented by Formula (I):

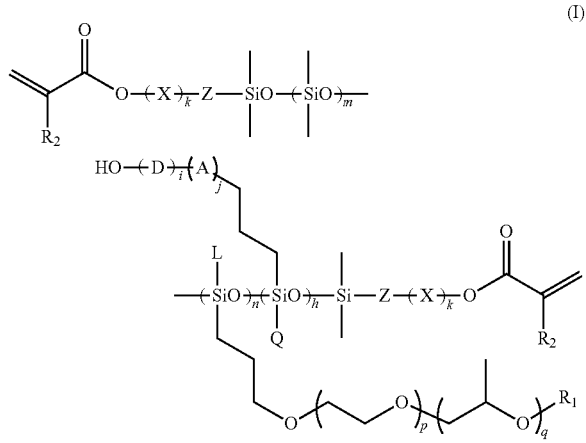

wherein $R_1$ and $R_2$ are independently selected from either hydrogen or a methyl group, X is $CH_2CH_2O$ or $CH_2CH(OH)CH_2O$, k is an integer of 0 or 1, Z is a $C_2$-$C_{10}$ alkylene, m is an integer of 0 to 160, n is an integer of 1 to 75, p is an integer of 0 to 40, q is an integer of 0 to 20, h is an integer of 0 to 75, j is an integer of 0 or 1, A is O or $CH_2$, i is an integer of 0 or 1, D is a $C_2$-$C_6$ alkylene optionally substituted with one or more groups selected from hydroxyl, methoxy, methyl, and ethyl, L is either methyl or a side chain that is the same as an opposite side chain on the same silicon atom as L, Q is either methyl or a side chain that is the same as an opposite side chain on the same silicon atom as Q, where the sum of m, n, and h is at least 5, wherein the HEMA-compatible polysiloxane has an HLB value of at least 5, or has a hydroxyl group content of at least 1 wt. % based on the average molecular weight of the polysiloxane, or has both an HLB value of at least 5 and has a hydroxyl group content of at least 1 wt. %, wherein the wt. % of the hydroxyalkyl methacrylate and the HEMA-compatible polysiloxane is based on the total weight of polymerizable monomers in the composition, and wherein when Z is a $C_3$ alkylene, and when i and j are 0, then $R_1$ is methyl and/or the at least one of p and q is at least 1, and when j is 1 and A is 0, then i is 1 and $R_1$ is methyl and/or p and q are both 0 or at least 1 or at least one of p and q is at least 2 and/or D is $C_3$-$C_6$ alkylene optionally substituted with one or more groups selected from hydroxyl, methoxy, methyl and ethyl.

2. The contact lens of claim 1, wherein the HEMA-compatible polysiloxane has an HLB value of at least 7.

3. The contact lens of claim 1, wherein the HEMA-compatible polysiloxane has a hydroxyl group content of at least 4 wt. %.

4. The contact lens of claim 1, wherein m of Formula I is an integer of less than 60.

5. The contact lens of claim 1, wherein when $R_1$ of Formula I is a methyl group the hydroxyl group content of the HEMA-compatible polysiloxane is at least 1 wt. %.

6. The contact lens of claim 1, wherein X is $CH_2CH(OH)CH_2O$.

7. The contact lens of claim 1, wherein the polymerizable composition comprises from about 0.1 wt. % to about 5 wt. % methacrylic acid or acrylic acid.

8. The contact lens of claim 1, wherein the polymerizable composition comprises at least 35 wt. % of the hydroxyalkyl methacrylate.

9. The contact lens of claim 1, wherein the hydroxyalkyl methacrylate comprises 2-hydroxyethyl methacrylate (HEMA).

10. The contact lens of claim 9, wherein the hydroxyalkyl methacrylate additionally comprises 2-hydroxybutyl methacrylate (HOB).

11. The contact lens of claim 1 having an equilibrium water content (EWC) of about 40 wt. % to about 55 wt. %.

12. A method of manufacturing an optically clear silicone hydrogel contact lens, comprising:
 a) polymerizing a polymerizable composition to form the polymeric lens body; and
 b) hydrating the polymeric lens body, wherein the polymerizable composition comprises:
  i) at least 25 wt. % of at least one hydroxyalkyl methacrylate; and
  ii) at least 20 wt. % of at least one HEMA-compatible polysiloxane represented by Formula (I):

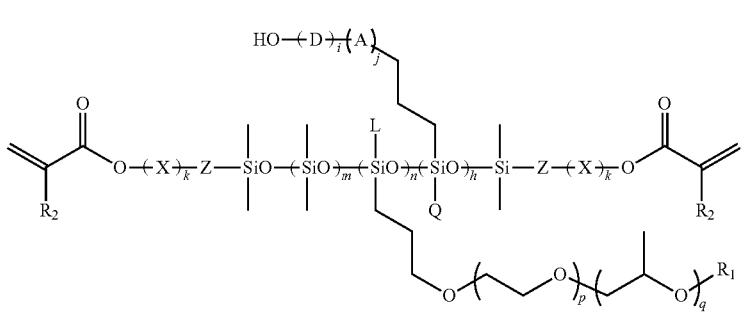

wherein $R_1$ and $R_2$ are independently selected from either hydrogen or a methyl group, X is $CH_2CH_2O$ or $CH_2CH(OH)CH_2O$, k is an integer of 0 or 1, Z is a $C_2$-$C_{10}$ alkylene, m is an integer of 0 to 160, n is an integer of 1 to 75, p is an integer of 0 to 40, q is an integer of 0 to 20, h is an integer of 1 to 75, j is an integer of 0 or 1, A is 0 or $CH_2$, i is an integer of 0 or 1, D is a $C_2$-$C_6$ alkylene optionally substituted with one or more groups selected from hydroxyl, methoxy, methyl, and ethyl, L is either methyl or a side chain that is the same as an opposite side chain on the same silicon atom as L, Q is either methyl or a side chain that is the same as an opposite side chain on the same silicon atom as Q, where the sum of m, n, and h is at least 5, wherein the HEMA-compatible polysiloxane has an HLB value of at least 5, or has a hydroxyl group content of at least 1 wt. % based on the average molecular weight of the polysiloxane, or has both an HLB value of at least 5 and has a hydroxyl group content of at least 1 wt. %, wherein the wt. % of the hydroxyalkyl methacrylate and the HEMA-compatible polysiloxane is based on the total weight of polymerizable monomers in the composition, and wherein when Z is a $C_3$ alkylene, and when i and j are 0, then $R_1$ is methyl and/or the at least one of p and q is at least 1, and when j is 1 and A is O, then i is 1 and $R_1$ is methyl and/or p and q are both 0 or at least 1 or at least one of p and q is at least 2 and/or D is $C_3$-$C_6$ alkylene optionally substituted with one or more groups selected from hydroxyl, methoxy, methyl and ethyl.

13. The method of claim 12, wherein the polymerizable composition is cured in a mold to form the polymeric lens body, and wherein the polymeric lens body is dry-delensed from the mold prior to hydrating the polymeric lens body.

14. The method of claim 13, wherein the polymeric lens body is dry when contacted with a packaging solution.

15. A HEMA-compatible polysiloxane having the structure of Formula I:

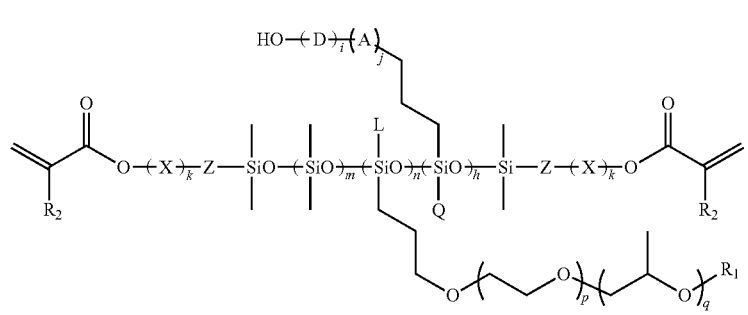

(I)

wherein $R_1$ and $R_2$ are independently selected from either hydrogen or a methyl group, X is $CH_2CH_2O$ or $CH_2CH(OH)CH_2O$, k is an integer of 0 or 1, Z is a $C_2$-$C_{10}$ alkylene, m is an integer of 0 to 160, n is an integer of 1 to 75, p is an integer of 0 to 40, q is an integer of 0 to 20, h is an integer of 1 to 75, j is an integer of 0 or 1, A is O or $CH_2$, i is an integer of 0 or 1, D is a $C_2$-$C_6$ alkylene optionally substituted with one or more groups selected from hydroxyl, methoxy, methyl, and ethyl, L is either methyl or a side chain that is the same as an opposite side chain on the same silicon atom as L, Q is either methyl or a side chain that is the same as an opposite side chain on the same silicon atom as Q, where the sum of m, n, and h is at least 5, wherein the HEMA-compatible polysiloxane has an HLB value of at least 5, or has a hydroxyl group content of at least 1 wt. % based on the average molecular weight of the polysiloxane, or has both an HLB value of at least 5 and has a hydroxyl group content of at least 1 wt. %, wherein the wt. % of the hydroxyalkyl methacrylate and the HEMA-compatible polysiloxane is based on the total weight of polymerizable monomers in the composition, wherein when $R_1$ is a methyl group, the hydroxyl group content is at least 1 wt. %, and wherein when Z is a $C_3$ alkylene, and when i and j are 0, then $R_1$ is methyl and/or the at least one of p and q is at least 1, and when j is 1 and A is O, then i is 1 and $R_1$ is methyl and/or p and q are both 0 or at least 1 or at least one of p and q is at least 2 and/or D is $C_3$-$C_6$ alkylene optionally substituted with one or more groups selected from hydroxyl, methoxy, methyl and ethyl.

16. The HEMA-compatible polysiloxane of claim 15, wherein X is $CH_2CH(OH)CH_2O$.

17. The HEMA-compatible polysiloxane of claim 16, wherein Z is a $C_3$ alkylene.

18. The HEMA-compatible polysiloxane of claim 15, wherein m is an integer of less than 60.

19. A compound of structure (2):

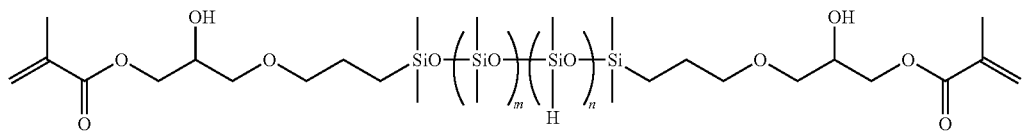

wherein m is 0 or an integer of at least 1, and n is an integer of at least 1.

20. A method of making a polysiloxane comprising hydrosilylation of the compound of claim 19.

* * * * *